US010583602B2

(12) United States Patent
Koerner et al.

(10) Patent No.: US 10,583,602 B2
(45) Date of Patent: Mar. 10, 2020

(54) CONTAINER AND METHOD OF MANUFACTURE

(71) Applicant: RING Container Technologies, Oakland, TN (US)

(72) Inventors: Dennis W. Koerner, Memphis, TN (US); Douglas M. Dygert, Olive Branch, MS (US); Daniel Futral, Somerville, TN (US); Brian Smith, Collierville, TN (US)

(73) Assignee: RING CONTAINER TECHNOLOGIES, LLC, Oakland, TN (US)

( * ) Notice: Subject to any disclaimer, the term of this patent is extended or adjusted under 35 U.S.C. 154(b) by 251 days.

(21) Appl. No.: 15/455,503

(22) Filed: Mar. 10, 2017

(65) Prior Publication Data
US 2017/0259486 A1 Sep. 14, 2017

Related U.S. Application Data

(60) Provisional application No. 62/307,069, filed on Mar. 11, 2016, provisional application No. 62/336,941, filed on May 16, 2016.

(51) Int. Cl.
*B29C 49/06* (2006.01)
*B29C 49/00* (2006.01)
(Continued)

(52) U.S. Cl.
CPC .............. *B29C 49/06* (2013.01); *B29B 11/14* (2013.01); *B29C 49/0005* (2013.01);
(Continued)

(58) Field of Classification Search
CPC . B29C 49/06; B29C 49/7273; B29C 49/0005; B29C 49/221; B29C 49/0073; B29C 49/023; B29B 11/08; B29B 11/14
See application file for complete search history.

(56) References Cited

U.S. PATENT DOCUMENTS 5,582,788 A * 12/1996 Collette .............. B29C 45/7207
264/297.2
2002/0022099 A1 * 2/2002 Schmidt ................. B32B 27/18
428/35.7
(Continued)

FOREIGN PATENT DOCUMENTS

EP 1301330 A1 4/2003
EP 0885105 B1 1/2005
(Continued)

OTHER PUBLICATIONS

International Search Report International application No. PCT/US2017/021765 prepared by European Patent Office, P.B. 5818 Patentlaan 2, NL-2280 HV Rijswijk dated Jul. 19, 2017.
(Continued)

*Primary Examiner* — Nahida Sultana
(74) *Attorney, Agent, or Firm* — Sorell, Lenna & Schmidt, LLP

(57) ABSTRACT

A method includes injection molding a preform using a two phase injection system having a first phase in which a material is injected into the preform and a second phase in which the material is injected into the preform. The preform is disposed in a mold. The preform is blow molded into an intermediate article. The intermediate article is trimmed to form a finished container. The first phase includes injecting a material into the preform to form a single layer of the preform and the second phase includes injecting the material to form inner and outer layers and an intermediate layer between the inner and outer layers. The inner and outer layers include the material and the intermediate layer includes at least one additive. Finished containers are disclosed.

20 Claims, 6 Drawing Sheets

(51) Int. Cl.
    *B29C 49/22*    (2006.01)
    *B29C 49/42*    (2006.01)
    *B29B 11/14*    (2006.01)
    B29K 105/26    (2006.01)
    B29K 105/00    (2006.01)
    B29K 103/06    (2006.01)
    B29B 11/08    (2006.01)
    B29C 49/02    (2006.01)
    B29K 105/04    (2006.01)
    B29L 31/00    (2006.01)
    B29K 67/00    (2006.01)
    B29K 105/16    (2006.01)
    B29L 9/00    (2006.01)

(52) U.S. Cl.
    CPC ........ *B29C 49/221* (2013.01); *B29C 49/4273* (2013.01); *B29B 11/08* (2013.01); *B29B 2911/1402* (2013.01); *B29B 2911/1404* (2013.01); *B29B 2911/1408* (2013.01); *B29B 2911/14026* (2013.01); *B29B 2911/14033* (2013.01); *B29B 2911/14093* (2013.01); *B29B 2911/14146* (2013.01); *B29B 2911/14153* (2013.01); *B29B 2911/14326* (2013.01); *B29B 2911/14646* (2013.01); *B29B 2911/14986* (2013.01); *B29B 2911/14993* (2013.01); *B29C 49/0073* (2013.01); *B29C 2049/023* (2013.01); *B29C 2049/025* (2013.01); *B29C 2049/228* (2013.01); *B29C 2793/0027* (2013.01); *B29K 2067/003* (2013.01); *B29K 2103/06* (2013.01); *B29K 2105/0005* (2013.01); *B29K 2105/0014* (2013.01); *B29K 2105/0032* (2013.01); *B29K 2105/04* (2013.01); *B29K 2105/16* (2013.01); *B29K 2105/26* (2013.01); *B29K 2995/002* (2013.01); *B29K 2995/004* (2013.01); *B29K 2995/0021* (2013.01); *B29K 2995/0067* (2013.01); *B29K 2995/0069* (2013.01); *B29L 2009/00* (2013.01); *B29L 2031/716* (2013.01); *B29L 2031/7158* (2013.01)

(56) References Cited

U.S. PATENT DOCUMENTS

| | | | |
|---|---|---|---|
| 2005/0218564 A1 | 10/2005 | Nahill et al. | |
| 2006/0073294 A1* | 4/2006 | Hutchinson | B29C 44/04 428/35.7 |
| 2006/0246245 A1* | 11/2006 | Liu | B65D 1/0207 428/36.92 |
| 2007/0222111 A1* | 9/2007 | Hussain | B29C 45/1603 264/255 |
| 2008/0258353 A1* | 10/2008 | Hutchinson | B29C 45/1618 264/483 |
| 2009/0169786 A1* | 7/2009 | Dierick | B29C 49/0005 428/36.8 |
| 2009/0226651 A1* | 9/2009 | Chisholm | B29C 41/12 428/35.7 |
| 2010/0239799 A1* | 9/2010 | Van Hove | B29B 11/14 428/35.7 |
| 2011/0229701 A1* | 9/2011 | Rivett | B29C 47/0026 428/212 |
| 2011/0262668 A1* | 10/2011 | Akkapeddi | B29B 11/14 428/35.7 |
| 2012/0193835 A1* | 8/2012 | Suzuki | B29C 48/267 264/459 |
| 2013/0132607 A1* | 5/2013 | Sinha | H04L 45/00 709/238 |
| 2014/0131920 A1* | 5/2014 | Nakahara | B29B 11/14 264/328.16 |
| 2014/0287079 A1* | 9/2014 | Hosokoshiyama | B29C 49/22 425/130 |
| 2014/0327176 A1* | 11/2014 | Chiba | B29B 11/08 264/241 |
| 2015/0079320 A1* | 3/2015 | Katou | B65D 25/34 428/35.7 |
| 2015/0258726 A1* | 9/2015 | Berg, Jr. | B29B 11/08 264/532 |
| 2016/0236820 A1* | 8/2016 | Paauwe | B65D 25/16 |
| 2017/0326779 A1* | 11/2017 | Toyoda | B29C 49/0005 |

FOREIGN PATENT DOCUMENTS

| | | |
|---|---|---|
| WO | 2006099700 A2 | 9/2006 |
| WO | 2006107099 A1 | 10/2006 |
| WO | 2012134996 A1 | 4/2014 |
| WO | 2012134996 A1 | 9/2017 |
| WO | 2017156384 A1 | 9/2017 |

OTHER PUBLICATIONS

Written Opinion of the International Searching Authority International application No. PCT/US2017/021765 prepared by European Patent Office, P.B. 5818 Patentlaan 2, NL-2280 HV Rijswijk.
International Application No. PCT/US2017/021765, International Preliminary Report on Patentability, Written Opinion of the International Searching Authority, International Preliminary Report on Patent ability dated Sep. 11, 2018 from International Bureau of WIPO, Geneva, Switzerland.

* cited by examiner

| Day | 0 | 13 | 31 | 42 | 56 | 73 | 83 | 98 | 112 | 128 | 139 | 150 |
|---|---|---|---|---|---|---|---|---|---|---|---|---|
| PET | | 7.090 | 7.490 | 11.200 | 11.005 | 11.580 | 11.630 | 12.450 | 14.480 | 13.585 | 14.970 | 14.295 |
| 1.4 Wt% Scavenger-Container | 0 | 6.090 | 6.150 | 9.933 | 9.133 | 9.237 | 9.107 | 9.717 | 11.733 | 10.267 | 11.843 | 11.027 |
| 2.8 Wt% Scavenger-Container | 0 | 5.040 | 5.235 | 8.495 | 7.760 | 7.580 | 7.385 | 7.730 | 9.335 | 7.890 | 9.295 | 8.230 |
| 4.2 Wt% Scavenger-Container | 0 | 4.285 | 3.935 | 6.990 | 6.270 | 5.795 | 5.265 | 5.255 | 6.620 | 4.740 | 5.730 | 4.290 |

CONTAINER AND METHOD OF MANUFACTURE

TECHNICAL FIELD

The present disclosure generally relates to blow-molded containers and more particularly to wide plastic containers and methods for making the same for food and/or packaging, for example.

BACKGROUND

Plastic blow-molded containers are commonly used for food and/or beverage packaging products. Many food and beverage products are sold to the consuming public in blow-molded containers. These containers can be made from polyethylene terephythalate or other suitable plastic resins in a range of sizes. The empty blow-molded containers can be filled with food and/or beverage products at a fill site utilizing automated fill equipment.

For example, manufacture of such plastic blow-molded containers can include initially forming plastic resin into a preform, which may be provided by injection molding. Typically, the preform includes a mouth and a generally tubular body that terminates in a closed end. Prior to being formed into containers, preforms are softened and transferred into a mold cavity configured in the shape of a selected container. In the mold cavity, the preforms are blow-molded or stretch blow-molded and expanded into the selected container.

Such plastic blow-molded containers may be produced on single stage injection mold equipment. The single stage blow molding process combines the injection molding of the preform and blowing of the container into one machine. This machine has an extruder that melts resin pellets and injects the molten resin into a mold to create the preform. The preform is transferred to a blow station to form the container and removed from the machine. In some cases, the plastic blow-molded containers are produced with two-stage equipment. The two-stage equipment makes preforms in an injection molding machine and then reheats and blows the preforms into selected containers in a separate blowing machine. This disclosure describes an improvement over these prior art technologies.

SUMMARY

In one embodiment, in accordance with the principles of the present disclosure, a method for manufacturing a container is provided. The method includes injection molding a preform using a two phase injection system having a first phase in which a material is injected into the preform and a second phase in which the material is injected into the preform. The preform is disposed in a mold. The preform is blow molded into an intermediate article. The intermediate article is trimmed to form a finished container. The first phase includes injecting a material into the preform to form a single layer of the preform and the second phase includes injecting the material to form inner and outer layers and an intermediate layer between the inner and outer layers. The inner and outer layers include the material and the intermediate layer includes at least one additive. Finished containers are disclosed. In some embodiments, the inner, outer and intermediate layers each have a non-uniform thickness. In some embodiments, the inner, outer and intermediate layers each have an irregular thickness. In some embodiments, the intermediate layer comprises greater than 25% of a wall thickness of the finished container. In some embodiments, the at least additive is present in an amount between about 0.5 wt. % and about 5.0 wt. % of the finished container. In some embodiments, the plurality of layers comprises a third layer, the second layer being positioned between the first layer and the third layer, wherein the single layer, the first layer and the third layer each consist of the same material and the single layer, the first layer and the third layer are free of any additives. In some embodiments, the single layer and the inner and outer layers each consist of polyethylene terephythalate. In some embodiments, the at least additive comprises at least one of a group consisting of active oxygen scavengers, passive oxygen scavengers, colorants, calcium carbonate fillers, foaming agents, polymers, metals, compatibilizers, catalysts, and fatty acid salts

BRIEF DESCRIPTION OF THE DRAWINGS

The present disclosure will become more readily apparent from the specific description accompanied by the following drawings, in which.

DETAILED DESCRIPTION

Figure 1:
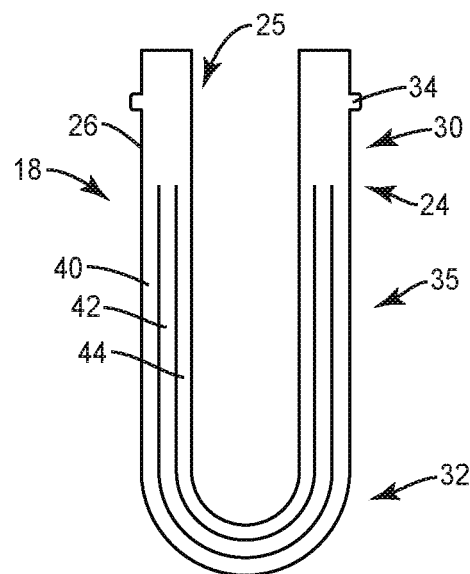
FIG. 1 is a side, cross section view of a component of one embodiment of a container system in accordance with the principles of the present disclosure.

The exemplary embodiments of blow-molded containers and more particularly, polyethylene terephythalate (PET) containers and methods for making the same are discussed in terms of food packaging products. In some embodiments, the present container is manufactured via an injection molded preform, which is subjected to a blow mold and trim process. In some embodiments, the present container can be filled with food, food preparation oils, viscous and/or beverage products. In some embodiments, the present container can be employed as a cold fill container. In some embodiments, the present container can be employed as a hot fill container. In some embodiments, the present container is manufactured as a 22 ounce container filled with a non-dairy creamer. In some embodiments, the present container is manufactured as a one kilogram container filled with a non-dairy creamer. In some embodiments, the present container is manufactured as a 60 ounce container filled with peanut butter. In some embodiments, the present container is employed as a light weight, high strength and barrier food packaging product.

In some embodiments, the present disclosure includes a container system that is employed with a method for manufacturing food packaging having the ability to produce food packages in a manner that minimizes the cost of scrap material and/or allows the scrap material to be reused in other applications, such as, for example, the manufacturing of other containers that may be used for food packaging, for example, as described herein.

In some embodiments, the present disclosure includes a method of producing a container wherein a barrier material is located in a discrete layer of a first portion of a preform that is used to make the container, while the discrete layer of barrier material is not present in a second portion of the preform. In some embodiments, the discrete layer may include other materials in addition to the barrier material, such as, for example, polyethylene terephythalate (PET). In some embodiments, the second portion of the preform forms dome or moil scrap that is trimmed from the first portion. In some embodiments, the first portion forms a majority the finished container, while the second portion forms only a small percentage of the finished container. In some embodiments, a majority of the second portion is trimmed from the first portion so that most of the second portion may be used as scrap. In some embodiments, the entire second portion is trimmed from the first portion such that the entire second portion may be used as scrap. In some embodiments, the scrap is used to make other containers. That is, since the second portion does not include any additives, for example, the section of the second portion that is trimmed off remains suitable for use in making additional containers. Indeed, providing scrap material that is free of additives allows for full utilization of the scrap material and avoids processing issues associated with reprocessing scrap material that normally would contain additives and barrier materials.

In some embodiments, the present disclosure includes a method of producing a container wherein scrap material produced in manufacturing the container is free of material additives, such as, for example, passive oxygen scavengers, active oxygen scavengers, colorants, calcium carbonate fillers and foaming agents. In some embodiments, the additives include one or more catalyst. These additives serve particular functions in a PET bottle or container. In some embodiments, the scrap material produced in manufacturing the container is a dome or moil scrap that is trimmed from an intermediate article used to form the finished container. In blow and trim applications where a portion of the blown container is removed from the final bottles (dome, moil, etc.) it is desirable to not have these additives in the portion that is being removed. There are numerous reasons for not having these additives in the removed portion of the bottle, such as, for example, cost savings and reprocessing issues. Indeed, many of these additives are expensive and it is desirable not to add extra cost into sections of the bottle that will not be used in the marketplace. Moreover, these additives can cause considerable reuse issues in the grinding, drying and extrusion processes of the dome and moil. Processors want to be able to reintroduce this scrap material back into their processes so as not to lose the cost of the PET. In some embodiments, these additives can cause clarity issues, yellowing, varying color percentages and activation of the active oxygen scavengers when reintroduced in the process along with virgin PET.

In blow and trim applications, the presence of additives in the preform can also cause layer delamination issues at the trim point on the bottle. In some embodiments, the present disclosure avoids this by stopping the multi-layered preform material short of the trim point, which allows for a section of the blown bottle (primarily in the neck finish and/or other portions) not to have the additive present. That is, the multi-layered portion of the preform that includes the additives terminates below the trim point and a material that does not contain any additives extends from the multi-layered portion through the trim point, and at least in some cases, beyond the trim point. In the event that the trim point is not a discrete line, the metal or plastic cover overlapping the thread portion would act as a physical oxygen block and little to no loss in oxygen blocking would occur in this region. That is, the need for additives adjacent to the trim point is reduced or eliminated by the cover that overlaps the thread portion In some embodiments, the present disclosure involves a two phase injection system. In a one phase of the two phase injection system, PET or virgin PET is injected into a preform. In another phase of the two phase injection system, the preform comprises multiple layers, at least one of the multiple layers including an additive. That is, PET or virgin PET and one or more selected additives are injected into the preform in a second injection cycle to form the multiple layers. In some embodiments, the phase in which the multiple layers are produced begins after the first phase is completed. This allows a dome or moil section of the blown bottle that is trimmed from a finished container and is ultimately ground, blended, dried and added to the virgin PET melt stream to be free of additives which will prevent the problems discussed above when the scrap is reused. In some embodiments, the term "virgin PET" refers to a material that consists solely of PET. That is, virgin PET does not include any additives, such as, for example, the additives discussed above.

It is envisioned that the present disclosure may be useful for manufacturers that run multiple sizes of blow and trim bottles for various end uses. For example, the present disclosure may be useful to produce containers for food items, such as, for example, dressings, sauces and peanuts, wherein oxygen permeation through the side walls of the container negatively affect shelf life and/or product flavor. It is envisioned that the present disclosure may be useful to produce containers for food items, such as, for example, non-dairy coffee creamers that require color pigment for both fill-line concealment and product protection against UV light penetration. Other containers that can be made from the disclosed process include containers for mayonnaise, salad dressings, peanuts as well as other condiments and/or food products.

As shown in the table below, the dome or moil section of the blown container constitutes 15%-40% of the total injected preform weight.

Trim-Lite Preform Weight Versus Bottles Weight

| Product | Preform Weight (grams) | Bottle Weight (grams) | Scrap Weight (grams) | Percent of scrap to bottle |
|---|---|---|---|---|
| 15 oz Mayonnaise | 39 | 25.5 | 13.5 | 34.62% |
| 30 oz Mayonnaise | 56 | 42.0 | 14 | 25.00% |
| 16 oz Peanut | 52 | 40.0 | 12 | 23.08% |
| 1 Kg Non-Diary Coffee Creamer | 74 | 60.0 | 14 | 18.92% |
| 22 oz Non-Dairy Coffee Creamer | 54 | 40.0 | 14 | 25.93% |

This material must be ground and reprocessed back into the system for economic considerations. Due to the high percentage of scrap material in the blown containers, it is desirable to produce scrap material that is free of any additives, such as, for example, the additives discussed above, to avoid wasting expensive additives and/or avoid complications or costs involved in processing scrap material that includes additives relative to scrap material that does not include additives.

In some embodiments, the present manufacturing method includes the steps of employing a single stage blow molding process and providing a preform that produces containers having a dome. In some embodiments, the method includes injection molding the preform using a two phase injection system, wherein one phase of the two phase injection system (e.g., a first phase) comprises injecting material into the preform and another phase of the two phase injection system (e.g., a second phase) comprises injecting material into the preform to form multiple layers, at least one of which includes an additive. The material used in the first phase does not include any additives. In some embodiments, the material used in the first phase is virgin PET without additives and the material used in the second phase is PET and additives. This allows the material that is used in the first phase to be reground as virgin PET so as to avoid regrinding issues discussed above.

In some embodiments, the method includes the step of testing the one or more preforms to ensure the one or more preforms include a selected weight and selected neck finish dimension. In some embodiments, the method includes the step of employing the one or more preforms with a four cavity production mold. In some embodiments, the method includes the step of blow molding the one or more preforms, which may comprise a container. In some embodiments, the method includes the step of trimming the one or more blow-molded preforms. In some embodiments, the step of trimming includes a spin trim operation to remove a dome from the one or more blow-molded preforms. In some embodiments, the method includes a two-stage blow molding process such that the one or more preforms are injection molded and stored before blowing the one or more preforms to produce a container. In some embodiments, the method includes reusing the dome to produce other containers, such as, for example other wide mouth containers. In some embodiments, reusing the dome includes grinding, blending, drying and adding the dome and adding the ground, blended and dried material to a melt stream, wherein the done does not contain additives.

In some embodiments, the present container is manufactured to include an oxygen scavenger and/or oxygen barrier material. That is, at least one layer of a portion of the container that is not removed during the manufacturing process includes an oxygen scavenger and/or oxygen barrier material such that the oxygen scavenger and/or oxygen barrier material is present in the finished container. In some embodiments, the container comprises one or more layers having an oxygen barrier material. In some embodiments, the oxygen barrier material is present in the container in an amount between about 0.5 wt. % and about 5.0 wt. % of the container. In some embodiments, the oxygen barrier material is present in the container in an amount about 2.0 wt. % of the container. In some embodiments, the oxygen barrier is a passive barrier and is unreactive with oxygen. In some embodiments, the oxygen barrier is an oxygen scavenger and is reactive with oxygen to capture the oxygen. In some embodiments, the oxygen scavenger includes one or more oxygen barrier, such as, for example, one or more polymers, metals, compatibilizers, catalysts, and/or fatty acid salts.

Figure 9:
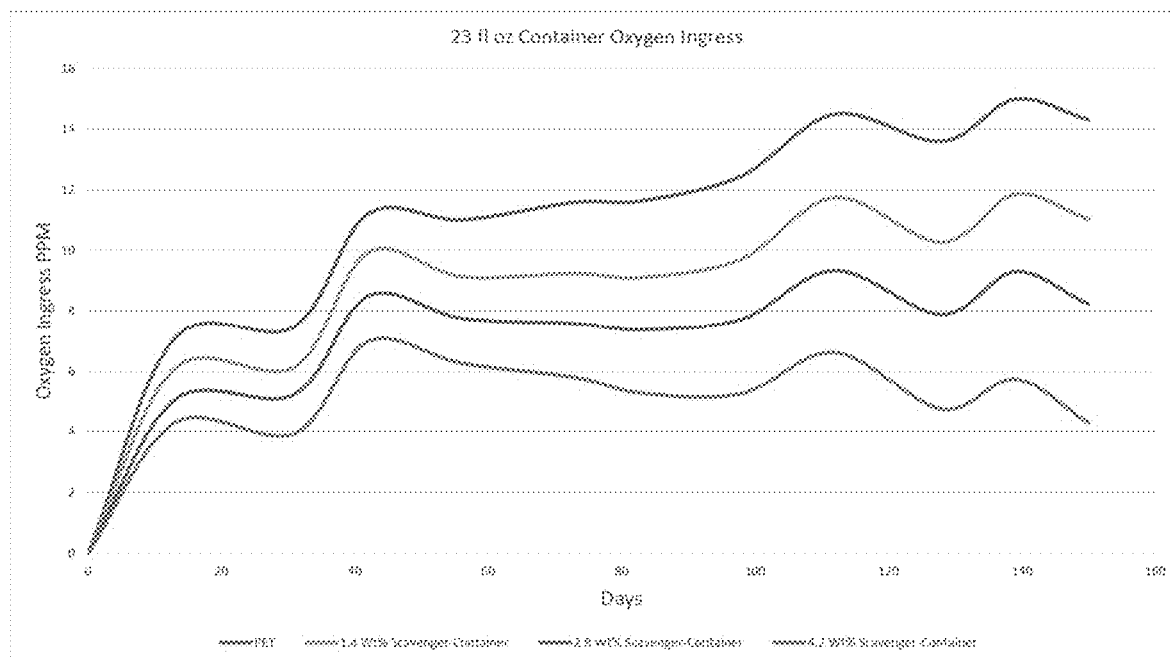
FIG. 9 is a graph showing the relationship between the amount of scavenger and the ability to inhibit oxygen ingress.

In some embodiments, the container comprises one or more layers having a scavenger, such as, for example, an oxygen barrier material. In some embodiments, the scavenger is one or more of the additives discussed herein. In some embodiments, the scavenger is present in the container in an amount between about 0.1 wt. % and about 20.0 wt. % of the container. In some embodiments, the scavenger is present in the container in an amount between about 0.1 wt. % and about 10.0 wt. % of the container. In some embodiments, the scavenger is present in the container in an amount between about 0.1 wt. % and about 5.0 wt. % of the container. In some embodiments, the scavenger is present in the container in an amount between about 1.0 wt. % and about 2.0 wt. % of the container. In some embodiments, the scavenger is present in the container in an amount between about 2.0 wt. % and about 3.0 wt. % of the container. In some embodiments, the scavenger is present in the container in an amount between about 4.0 wt. % and about 5.0 wt. % of the container. In some embodiments, the scavenger is present in the container in an amount of about 1.4 wt. % of the container. In some embodiments, the scavenger is present in the container in an amount of about 2.8 wt. % of the container. In some embodiments, the scavenger is present in the container in an amount of about 4.2 wt. % of the container. In some embodiments, the scavenger is present in the container in an amount greater than about 5.0 wt. % of the container. As shown in FIG. 9 and the table below, containers that include more of the scavenger inhibit oxygen ingress better than containers that include less of the scavenger or no scavenger at all.

| Weight % Scavenger | O2 Ingress Improvement @ 150 Days |
|---|---|
| 0 | 0 |
| 1.4 | 1.3 |
| 2.8 | 1.75 |
| 4.2 | 3.5 |

In some embodiments, the present manufacturing method provides PET enhancements via improved material orientation with selective physical performance features, such as, for example, improved top load performance, improved vacuum resistance performance and/or hoop strength, improved $O_2$ performance, improved moisture vapor transmission rate (MVTR) performance. In some embodiments, the enhancements include modifications to the manufacturing process or the addition of additives to provide a container made of PET that has a selected crystallinity, as discussed herein.

In some embodiments, the method is configured to produce a container that has a crystallinity of about 10%. In some embodiments, the method is configured to produce a container that has a crystallinity between about 15% and about 20%. In some embodiments, the preform is heated and stretched to produce a container having a crystallinity between about 18% and about 30%. In some embodiments, the preform is heated and stretched to produce a container having a crystallinity between about 20% and about 40%. In some embodiments, the preform includes a molecular weight between about 120,000 g/mol and about 240,000 g/mol. In some embodiments, the preform includes a molecular weight between about 250,000 g/mol and about 450,000 g/mol. In some embodiments, the preform comprises PET and has an axial stretch ratio of about 1.8 to 1 to about 2.4 to 1.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. Also, in some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a container system for producing food packaging products, a container, related components and methods of manufacturing a container with an injection molded preform. Alternate embodiments are also disclosed. Reference is made in detail to the exemplary embodiments of the present disclosure, which are illustrated in the accompanying figures. Turning to FIGS. 1-11, there are illustrated components of a container system and methods of manufacturing a container.

Figure 3:
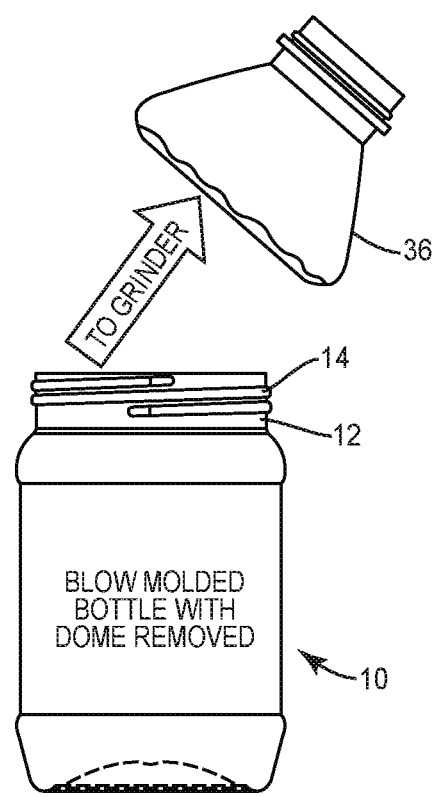
FIG. 3 is a side view of a component of one embodiment of a container system in accordance with the principles of the present disclosure.

A finished PET blow-molded container 10, as shown in FIG. 3, is constructed for use with a selected application, as described herein. In some embodiments, finished container 10 is a wide-mouth container. In some embodiments, the selected application includes food, food preparation oils, viscous and/or beverage products. In some embodiments, the selected application includes a 15 ounce container filled with mayonnaise. In some embodiments, the selected application includes a 30 ounce container filled with mayonnaise. In some embodiments, the selected application includes a 16 ounce container filled with peanuts. In some embodiments, the selected application includes a 1 kilogram container filled with non-dairy coffee creamer. In some embodiments, the selected application includes a 22 ounce container filled with non-dairy coffee creamer. In some embodiments, the selected application includes a 22 ounce container filled with a non-dairy creamer. In some embodiments, the selected application includes a one kilogram container filled with a non-dairy creamer. In some embodiments, the selected application includes a 60 ounce container filled with peanut butter. It is envisioned that finished container 10 may include any size and shape and may be filled with any type of food and/or beverage. In some embodiments, finished container 10 is configured for use for applications that do not include foods and/or beverages.

In some embodiments, container 10 is manufactured with selected physical performance features, such as, for example, a 60 ounce PET container having a body width of approximately 4.834 inches (in), a body depth of approximately 4.620 in, a neck diameter of 110 millimeters (mm), a weight of 96 grams (g), a T/L weight of 90 g, a vacuum average actual of 2.107 inches of mercury (inHg) and a vacuum minimum actual of 1.100 inHg.

In some embodiments, container 10 is manufactured with selected physical performance features, such as, for example, a 60 ounce PET container having a body width of approximately 4.834 in, a body depth of approximately 4.620 in, a neck diameter of 110 mm, a weight of 96 g, a T/L weight of 68 g, a vacuum average actual of 1.562 inHg and a vacuum minimum actual of 1.210 inHg.

In some embodiments, container 10 is manufactured with selected physical performance features, such as, for example, a 22 ounce high-density polyethylene (HDPE) container having a body width of approximately 3.800 in, a body depth of approximately 3.800 in, a neck diameter of 63 mm, a weight of 47 g, a T/L weight of 40 g, a top load minimum of 40 pound-force (Lbf) and a top load target of 95 Lbf.

In some embodiments, container 10 is manufactured with selected physical performance features, such as, for example, a one kg HDPE container having a body width of approximately 4.760 in, a body depth of approximately 4.760 in, a neck diameter of 63 mm, a weight of 77 g, a T/L weight of 60 g, a top load minimum of 90 Lbf and a top load target of 115 Lbf.

In some embodiments, container 10 comprises a bottle or container. In some embodiments, container 10 is used for food and/or beverage product packaging. In some embodiments, container 10 comprises a cylindrical threaded neck 12 wherein an outer diameter has a continuous thread 14. In some embodiments, thread 14 is in a range of about 53 mm to about 162 mm. In some embodiments, container 10 is manufactured via a two-stage method, as described herein. In some embodiments, container 10 has an outer finish diameter in a range of about 53 mm to about 120 mm. In some embodiments, container 10 is manufactured via a single stage method, as described herein. In some embodiments, container 10 has an outer finish diameter of about 162 mm. Container 10 is produced as a lower part of an intermediate article 16, as shown in FIG. 2. In some embodiments, container 10 is formed by injection molding a preform 18 (e.g., FIGS. 1-1C, 5 and 6) and then placing preform 18 into a cavity of a mold assembly, to be blown, as described herein.

Figure 4:
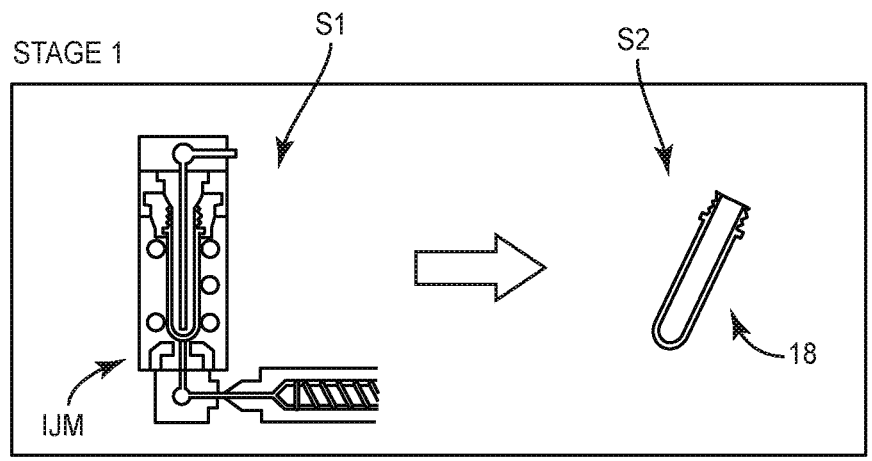
FIG. 4 is a schematic view of a method of manufacturing a container in accordance with the principles of the present disclosure.
Figure 4:
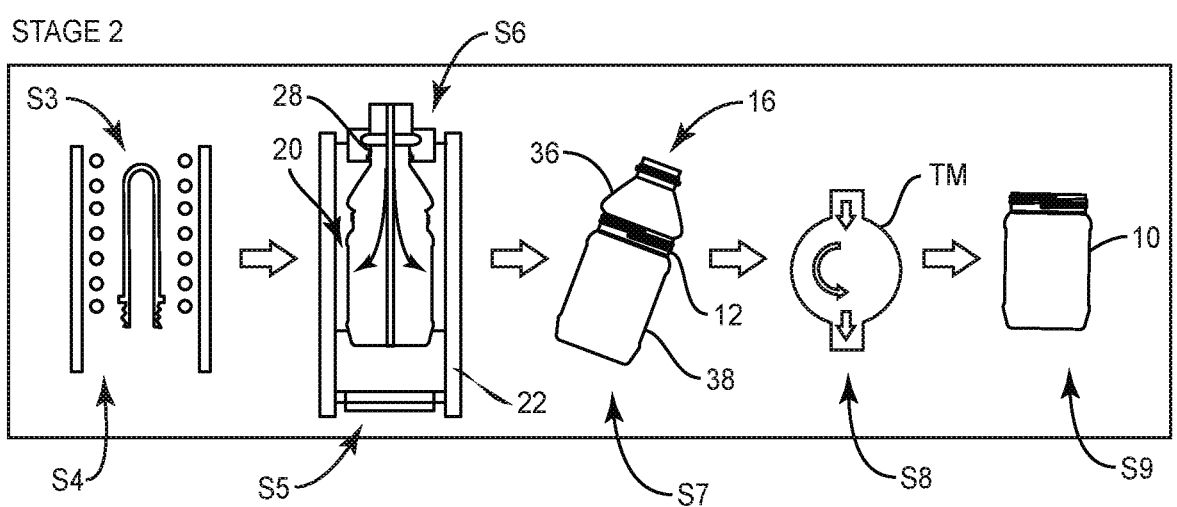

In some embodiments, container 10 is manufactured via a two-stage method, as shown in FIG. 4. In some embodiments, an initial step S1 includes injection molding preform 18 in an injection molding machine IJM during a first stage of the manufacturing operation. Preform 18 has a thread forming surface 24 below a preform neck 26. In some embodiments, preform 18 has thread forming surface 24, which includes a portion of preform 18 below neck 26 that will press against mold assembly 22 to form neck 12 and thread 14. In some embodiments, container 10 may be manufactured with a snap fit portion, spiral threads and/or a beaded rim. In some embodiments, preform 18 can be injection molded with a neck diameter smaller than the neck diameter of container 10, such that a diameter of an opening 28 at a top of mold assembly 22 is substantially reduced. As such, a plurality of mold cavities may be placed in mold assembly 22 of a blow machine of the two-stage equipment to provide improved production capacity. In some embodiments, container 10 may be manufactured with a hoop stretch ratio in a range of about 1.6 to 1 to about 2.0 to 1. In some embodiments, a step S2 includes removing preform 18 from machine IJM.

In some embodiments, injection molding preform 18 comprises injection molding preform 18 using a two phase injection system, wherein a first phase of the two phase injection system comprises injecting a material, such as for example, PET or virgin PET, into preform 18 and a second phase of the two phase injection system comprises injecting materials, such as for example, PET or virgin PET and a barrier material or additive, such as, for example, one or more passive oxygen scavengers, one or more active oxygen scavengers, one or more colorants, one or more calcium carbonate fillers and/or one or more foaming agents into preform 18. This results in a single layer of material (e.g., PET or virgin PET) forming a top portion 25 of preform 18 and material multiple layers of materials forming a bottom portion 35 of preform 18.

In some embodiments, the single layer of top portion 25 consists of one material, such as, for example, PET or virgin PET. In some embodiments, the multiple layers of bottom portion 25 include a first layer 40 that comprises the same material that forms the single layer of top portion 25, such as, for example, PET or virgin PET and a second layer 42 that comprises at least one additive, such as, for example, one or more of the additives discussed herein. In some embodiments, first layer 40 consists of PET or virgin PET and second layer 42 consists of PET or virgin PET and one or more of the additives discussed herein. In some embodiments, the single layer of top portion is free of any additives, such as, for example, the additives discussed herein. In some embodiments, layer 40 is free of any additives, such as, for example, the additives discussed herein. In some embodiments, layer 42 of preform 18 consists of the at least one additive. That is, layer 42 of preform 18 includes only the at least one additive. In some embodiments, layer 42 of preform 18 includes the at least one additive and at least one other material, such as, for example, PET. In some embodiments, layer 42 of preform 18 comprises at least 20% or at least about 20% of a wall thickness of preform 18, wherein the wall thickness of preform 18 is defined by the combined thicknesses of layer 40 and layer 42 of preform 18. In some embodiments, layer 42 of preform 18 comprises at least 25% or at least about 25% of the wall thickness of preform 18. In some embodiments, layer 42 of preform 18 comprises at least 30% or at least about 30% of the wall thickness of preform 18. In some embodiments, layer 42 of preform 18 comprises at least 35% or at least about 35% of the wall thickness of preform 18. In some embodiments, layer 42 of preform 18 comprises at least 40% or at least about 40% of the wall thickness of preform 18. In some embodiments, layer 42 of preform 18 comprises at least 45% or at least about 45% of the wall thickness of preform 18. In some embodiments, layer 42 of preform 18 comprises at least 50% or at least about 50% of the wall thickness of preform 18. In some embodiments, layer 42 of preform 18 comprises between 20% and 25% of the wall thickness of preform 18.

In some embodiments, layer 42 of preform 18 comprises between 25% and 30% of the wall thickness of preform 18. In some embodiments, layer 42 of preform 18 comprises between 30% and 35% of the wall thickness of preform 18. In some embodiments, layer 42 of preform 18 comprises between 35% and 40% of the wall thickness of preform 18. In some embodiments, layer 42 of preform 18 comprises between 40% and 45% of the wall thickness of preform 18. In some embodiments, layer 42 of preform 18 comprises between 45% and 50% of the wall thickness of preform 18. In some embodiments, layer 42 of preform 18 comprises between 50% and 55% of the wall thickness of preform 18.

Figure 2:
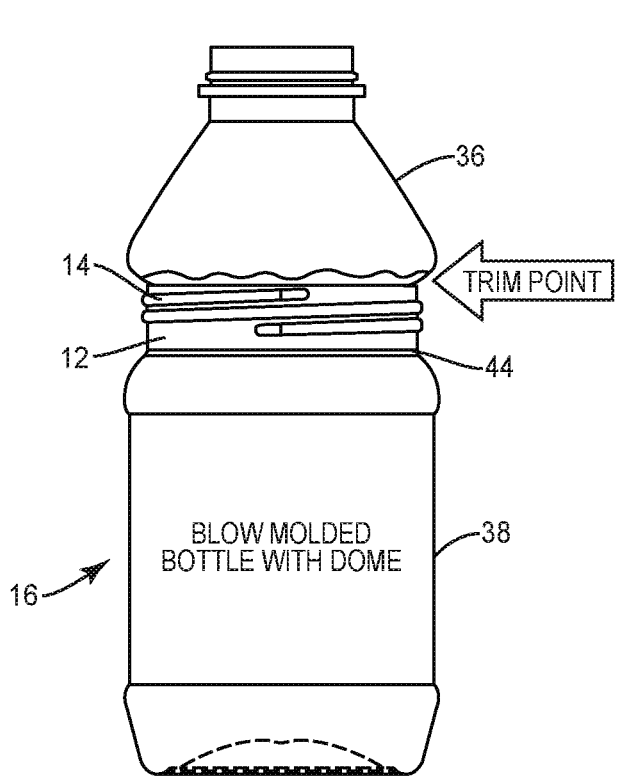
FIG. 2 is a side view of a component of one embodiment of a container system in accordance with the principles of the present disclosure.

As shown in FIG. 1, bottom portion 35 may include a third layer 44. In some embodiments, layer 44 is free of any additives, such as, for example, the additives discussed herein. In some embodiments, first layer 40 forms an outer surface of preform 18, third layer 44 forms an inner surface of preform 18 and second layer 42 is positioned between first layer 40 and third layer 44. In some embodiments, first layer 40 and third layer 44 comprise the same material, such as, for example, PET or virgin PET and second layer 42 comprises a material, such as, for example, PET or virgin PET and one or more additive, such as, for example, one or more of the additives discussed herein. In some embodiments, first layer 40 and third layer 44 consist of a single material, such as, for example, PET or virgin PET and second layer 42 comprises a material, such as, for example, PET or virgin PET and one or more additive, such as, for example, one or more of the additives discussed herein. In some embodiments, layers 40, 44 are free of any additives, such as, for example, the additives discussed herein, and second layer 42 comprises one or more additives, such as, for example, one or more of the additives discussed herein. In some embodiments, the one or more additives are evenly dispersed throughout layer 42. In some embodiments, the one or more additives are randomly dispersed in layer 42. In some embodiments, an inner portion of layer 42 comprises more of the one or more additives than an outer portion of layer 42. In some embodiments, the outer portion of layer 42 comprises more of the one or more additives than the inner portion of layer 42.

In some embodiments, layer 42 of preform 18 consists of the at least one additive. That is, layer 42 of preform 18 includes only the at least one additive. In some embodiments, layer 42 of preform 18 includes the at least one additive and at least one other material, such as, for example, PET. In some embodiments, layer 42 of preform 18 comprises at least 20% or at least about 20% of a wall thickness of preform 18, wherein the wall thickness of preform 18 is defined by the combined thicknesses of layer 40, layer 42 and layer 44 of preform 18. In some embodiments, layer 42 of preform 18 comprises at least 25% or at least about 25% of the wall thickness of preform 18. In some embodiments, layer 42 of preform 18 comprises at least 30% or at least about 30% of the wall thickness of preform 18. In some embodiments, layer 42 of preform 18 comprises at least 35% or at least about 35% of the wall thickness of preform 18. In some embodiments, layer 42 of preform 18 comprises at least 40% or at least about 40% of the wall thickness of preform 18. In some embodiments, layer 42 of preform 18 comprises at least 45% or at least about 45% of the wall thickness of preform 18. In some embodiments, layer 42 of preform 18 comprises at least 50% or at least about 50% of the wall thickness of preform 18. In some embodiments, layer 42 of preform 18 comprises between 20% and 25% of the wall thickness of preform 18. In some embodiments, layer 42 of preform 18 comprises between 25% and 30% of the wall thickness of preform 18. In some embodiments, layer 42 of preform 18 comprises between 30% and 35% of the wall thickness of preform 18. In some embodiments, layer 42 of preform 18 comprises between 35% and 40% of the wall thickness of preform 18. In some embodiments, layer 42 of preform 18 comprises between 40% and 45% of the wall thickness of preform 18. In some embodiments, layer 42 of preform 18 comprises between 45% and 50% of the wall thickness of preform 18. In some embodiments, layer 42 of preform 18 comprises between 50% and 55% of the wall thickness of preform 18. In some embodiments, layer 42 of preform 18 comprises greater than 55% of the wall thickness of preform 18.

In some embodiments, preform 18 does not include a sprue when preform 18 is introduced into the molding process. It is envisioned that preform 18 may be formed without using a sprue or that preform 18 may be formed using a sprue, wherein the sprue is severed or otherwise removed from preform 18 prior subjecting preform 18 to the molding process. As such, layer 42 is maintained between layers 40 and 44 such that no portion of layer 40 extends through layer 40 or layer 44 when preform 18 is positioned within the mold, as described herein. In this configuration, layer 40 defines the outermost surface of bottom portion 35 along the entire length of bottom portion 35. Furthermore, bottom portion 35 has an arcuate portion between the sidewalls, wherein the arcuate portion is continuously curved between the sidewalls, as shown in FIGS. 1-1C, 5 and 6. That is, the arcuate portion is continuously curved from one of the sidewalls to the other one of the sidewalls when preform 18 is positioned within the mold, as described herein. In some embodiments, the arcuate portion has a continuous radius of curvature from one of the sidewalls to the other one of the sidewalls when preform 18 is positioned within the mold, as described herein.

Figure 3A:
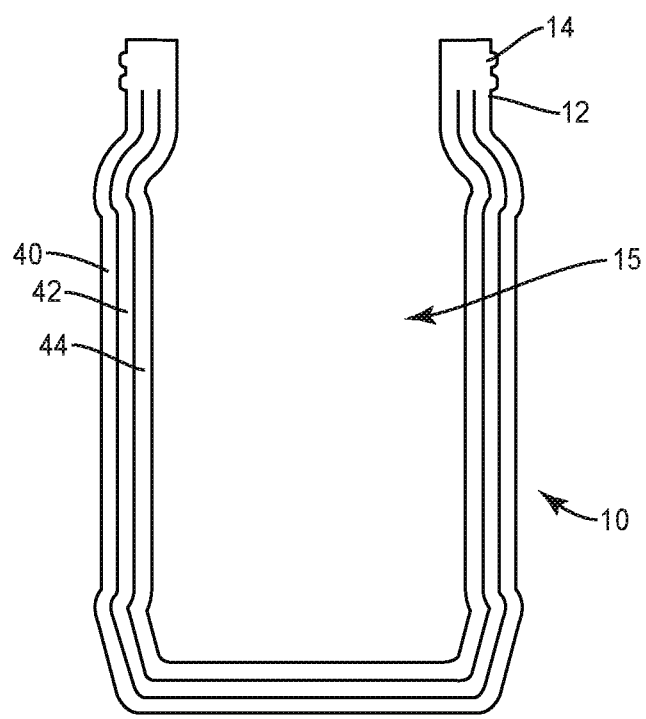
FIG. 3A is a side, cross section view of one embodiment of a component shown in FIG. 3.
Figure 3B:
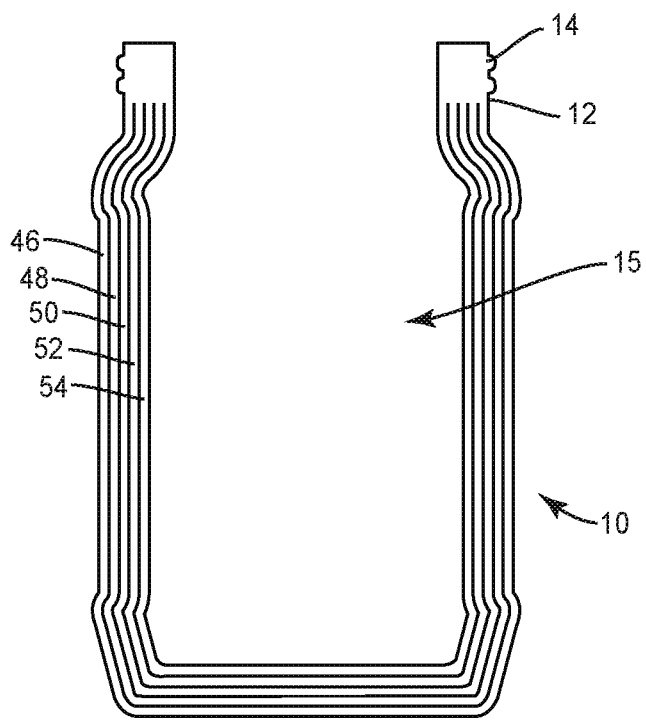
FIG. 3B is a side, cross section view of one embodiment of a component shown in FIG. 3.

During the molding process, layers 40, 42, 44 are maintained such that layers 40, 42, 44 are also present in finished container 10, as shown in FIGS. 3A and 3B. It has been found that the configuration of layers 40, 42, 44 discussed above makes the one or more additives in second layer 42 function more effectively that if the one or more additives were dispersed in each of layers 40, 42, 44. For example, when the one or more additive in second layer 42 is an oxygen scavenger, such as, for example, one or more of the oxygen scavengers discussed herein, the oxygen scavenger decreases the level of oxygen in container 10 more effectively than if the oxygen scavenger was also included in layers 40, 44. This will prevent or reduce the amount of oxygen that will be able to enter the inside 15 of container 10, hence extending the shelf life of any food and/or beverage product within container 10. Indeed, the configuration of layers 40, 42, 44 discussed above allows layer 42 to form a barrier that prevents or reduces the ability of oxygen to move from the environment surrounding container 10 to the inside 15 of container 10.

In some embodiments, layer 42 of container 10 consists of the at least one additive. That is, layer 42 of container 10 includes only the at least one additive. In some embodiments, layer 42 of container 10 includes the at least one additive and at least one other material, such as, for example, PET. In some embodiments, layer 42 of container 10 comprises at least 20% or at least about 20% of a wall thickness of container 10, wherein the wall thickness of container 10 is defined by the combined thicknesses of layer 40, layer 42 and layer 44 of container 10. In some embodiments, layer 42 of container 10 comprises at least 25% or at least about 25% of the wall thickness of container 10. In some embodiments, layer 42 of container 10 comprises at least 30% or at least about 30% of the wall thickness of container 10. In some embodiments, layer 42 of container 10 comprises at least 35% or at least about 35% of the wall thickness of container 10. In some embodiments, layer 42 of container 10 comprises at least 40% or at least about 40% of the wall thickness of container 10. In some embodiments, layer 42 of container 10 comprises at least 45% or at least about 45% of the wall thickness of container 10. In some embodiments, layer 42 of container 10 comprises at least 50% or at least about 50% of the wall thickness of container 10. In some embodiments, layer 42 of container 10 comprises between 20% and 25% of the wall thickness of container 10. In some embodiments, layer 42 of container 10 comprises between 25% and 30% of the wall thickness of container 10. In some embodiments, layer 42 of container 10 comprises between 30% and 35% of the wall thickness of container 10. In some embodiments, layer 42 of container 10 comprises between 35% and 40% of the wall thickness of container 10. In some embodiments, layer 42 of container 10 comprises between 40% and 45% of the wall thickness of container 10. In some embodiments, layer 42 of container 10 comprises between 45% and 50% of the wall thickness of container 10. In some embodiments, layer 42 of container 10 comprises between 50% and 55% of the wall thickness of container 10.

Figure 5:
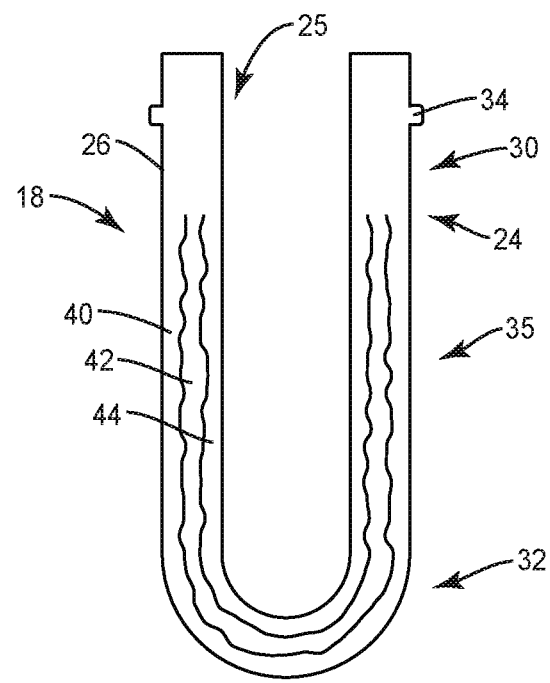
FIG. 5 is a side, cross section view of a component of one embodiment of a container system in accordance with the principles of the present disclosure.

In some embodiments, layers 40, 42, 44 have different thicknesses, as shown in FIG. 5. In some embodiments, at least one of layers 40, 42, 44 has an irregular thickness. That is, the thickness of at least one of layers 40, 42, 44 varies along all or a portion of bottom portion 35. In some embodiments, at least one of layers 40, 42, 44 has an undulating thickness. It is contemplated that preform 18 in the embodiment shown FIG. 5 may be formed by injecting a first material into a mold to form layer 40 or layer 44. A second material is then injected into the mold to form layer 42. After layer 42 is formed, the first material is injected into the mold to form the other one of layer 40 and layer 44. In some embodiments, the first material comprises of PET or virgin PET and the second material consists of PET or virgin PET and at least one additive, such as, for example, one or more of the additives discussed herein. In some embodiments, the first material is free of any additives, such as, for example, the additives discussed herein. In some embodiments, the first material consists of PET or virgin PET and the second material consists of PET or virgin PET and at least one additive, such as, for example, one or more of the additives discussed herein. In some embodiments, the one or more additives include an active oxygen scavenger, such as, for example, the oxygen scavengers discussed herein. In some embodiments, the one or more additives include a passive oxygen scavenger, such as, for example, nylon. In some embodiments, the one or more additives include active and passive oxygen scavengers.

In some embodiments, the single layer of top portion 25 has the same thickness in container 10 as the combined thickness of layers 40, 42, 44. In some embodiments, layers 40, 42, 44 each have the same thickness in container 10. In some embodiments, at least one of layers 40, 42, 44 in container 10 has a thickness that is greater than a thickness of another one of layers 40, 42, 44 in container 10. In some embodiments, at least one of layers 40, 42, 44 in container 10 has a thickness that is less than a thickness of another one of layers 40, 42, 44 in container 10. In some embodiments, layers 40, 44 each have the same thickness in container 10 and layer 42 has a thickness in container 10 that is different than the thicknesses of layers 40, 44. In some embodiments, layers 40, 44 each have the same thickness in container 10 and layer 42 has a thickness in container 10 that is greater than the thicknesses of layers 40, 44 in container 10. In some embodiments, layers 40, 44 each have the same thickness in container 10 and layer 42 has a thickness that is less than the thicknesses of layers 40, 44 in container 10.

In some embodiments, at least one of layers 40, 42, 44 in container 10 comprises strength hardened PET. In some embodiments, each of layers 40, 42, 44 in container 10 comprises strength hardened PET. In some embodiments, layer 42 comprises strength hardened PET in container 10 and layers 40, 44 do not. In some embodiments, at least one of layers 40, 44 comprise strength hardened PET in container 10 and layer 42 does not.

Figure 1A:
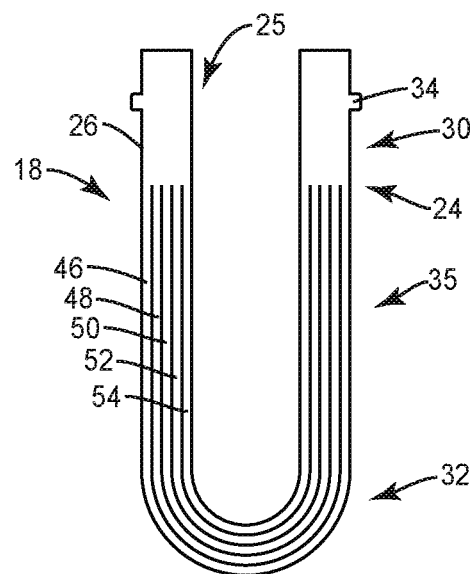
FIG. 1A is a side, cross section view of a component of one embodiment of a container system in accordance with the principles of the present disclosure.

In one embodiment, shown in FIG. 1A, the multiple layers of bottom portion 25 include a first layer 46, a second layer 48, a third layer 50, a fourth layer 52 and a fifth layer 54. First layer 46 forms an outer surface of preform 18 and fifth layer 54 forms an opposite inner surface of preform 18. In some embodiments, layers 46, 50, 54 each comprise the same material that forms the single layer of top portion 25, such as, for example, PET or virgin PET and layers 48, 52 each comprise at least one additive, such as, for example, one or more of the additives discussed herein. In some embodiments, layers 46, 50, 54 each consist of PET or virgin PET and layers 48, 52 each consist of PET or virgin PET and one or more of the additives discussed herein. In some embodiments, layers 46, 50, 54 are free of any additives, such as, for example, the additives discussed herein.

In some embodiments, layers 46, 50, 54 each comprise the same material, such as, for example, PET or virgin PET and layers 48, 52 each comprise a material, such as, for example, PET or virgin PET and one or more additive, such as, for example, one or more of the additives discussed herein. In some embodiments, layers 46, 50, 54 each consist of a single material, such as, for example, PET or virgin PET and layers 48, 52 each comprise a material, such as, for example, PET or virgin PET and one or more additive, such as, for example, one or more of the additives discussed herein. In some embodiments, the one or more additives are evenly dispersed throughout layers 48, 52. In some embodiments, the one or more additives are randomly dispersed in layers 48, 52. In some embodiments, inner portions of layers 48, 52 comprise more of the one or more additives than outer portions of layers 48, 52. In some embodiments, the outer portions of layers 48, 52 comprise more of the one or more additives than the inner portions of layer layers 48, 52. In some embodiments, layers 48, 52 comprise the same additives. In some embodiment, layer 48 comprises at least one additive, such as for example, one or more of the additives discussed herein, that is different from the additive or additives layer 52 comprises, wherein layer 52 comprises one or more of the additives discussed herein.

In some embodiments, layers 48, 52 of preform 18 each consist of the at least one additive. That is, layers 48, 52 of preform 18 each include only the at least one additive. In some embodiments, layers 48, 52 of preform 18 comprise at least 20% or at least about 20% of a wall thickness of preform 18, wherein the wall thickness of preform 18 is defined by the combined thicknesses of layer 46, layer 48, layer 50, layer 52 and layer 54 of preform 18. In some embodiments, layers 48, 52 of preform 18 comprise at least 25% or at least about 25% of the wall thickness of preform 18. In some embodiments, layers 48, 52 of preform 18 comprise at least 30% or at least about 30% of the wall thickness of preform 18. In some embodiments, layers 48, 52 of preform 18 comprise at least 35% or at least about 35% of the wall thickness of preform 18. In some embodiments, layers 48, 52 of preform 18 comprise at least 40% or at least about 40% of the wall thickness of preform 18. In some embodiments, layers 48, 52 of preform 18 comprise at least 45% or at least about 45% of the wall thickness of preform 18. In some embodiments, layers 48, 52 of preform 18 comprise at least 50% or at least about 50% of the wall thickness of preform 18. In some embodiments, layers 48, 52 of preform 18 comprise between 20% and 25% of the wall thickness of preform 18. In some embodiments, layers 48, 52 of preform 18 comprise between 25% and 30% of the wall thickness of preform 18. In some embodiments, layers 48, 52 of preform 18 comprise between 30% and 35% of the wall thickness of preform 18. In some embodiments, layers 48, 52 of preform 18 comprise between 35% and 40% of the wall thickness of preform 18. In some embodiments, layers 48, 52 of preform 18 comprise between 40% and 45% of the wall thickness of preform 18. In some embodiments, layers 48, 52 of preform 18 comprise between 45% and 50% of the wall thickness of preform 18. In some embodiments, layers 48, 52 of preform 18 comprise between 50% and 55% of the wall thickness of preform 18. In some embodiments, layers 48, 52 of preform 18 comprise greater than 55% of the wall thickness of preform 18.

During the molding process, layers 46, 48, 50, 52, 54 are maintained such that layers 46, 48, 50, 52, 54 are also present in finished container 10, as shown in FIG. 3B. It is envisioned the configuration of layers 46, 48, 50, 52, 54 discussed above makes the one or more additives in layers 48, 52 function more effectively that if the one or more additives were dispersed in each of layers 46, 48, 50, 52, 54. For example, when the one or more additive in layers 48, 52 is an oxygen scavenger, such as, for example, one or more of the oxygen scavengers discussed herein, the oxygen scavenger decreases the level of oxygen in container 10 more effectively than if the oxygen scavenger was also included in layers 46, 50, 54. This will prevent or reduce the amount of oxygen that will be able to enter the inside 15 of finished container, hence extending the shelf life of any food and/or beverage product within finished container 10. Indeed, the configuration of layers 46, 48, 50, 52, 54 discussed above allows layers 48, 52 to form barriers that prevent or reduce the ability of oxygen to move from the environment surrounding container 10 to the inside 15 of container 10.

In some embodiments, layers 48, 52 each consist of the at least one additive. That is, layers 48, 52 of container 10 each include only the at least one additive. In some embodiments, layers 48, 52 of container 10 comprise at least 20% or at least about 20% of a wall thickness of container 10, wherein the wall thickness of container 10 is defined by the combined thicknesses of layer 46, layer 48, layer 50, layer 52 and layer 54 of container 10. In some embodiments, layers 48, 52 of container 10 comprise at least 25% or at least about 25% of the wall thickness of container 10. In some embodiments, layers 48, 52 of container 10 comprise at least 30% or at least about 30% of the wall thickness of container 10. In some embodiments, layers 48, 52 of container 10 comprise at least 35% or at least about 35% of the wall thickness of container 10. In some embodiments, layers 48, 52 of container 10 comprise at least 40% or at least about 40% of the wall thickness of container 10. In some embodiments, layers 48, 52 of container 10 comprise at least 45% or at least about 45% of the wall thickness of container 10. In some embodiments, layers 48, 52 of container 10 comprise at least 50% or at least about 50% of the wall thickness of container 10. In some embodiments, layers 48, 52 of container 10 comprise between 20% and 25% of the wall thickness of container 10. In some embodiments, layers 48, 52 of container 10 comprise between 25% and 30% of the wall thickness of container 10. In some embodiments, layers 48, 52 of container 10 comprise between 30% and 35% of the wall thickness of container 10. In some embodiments, layers 48, 52 of container 10 comprise between 35% and 40% of the wall thickness of container 10. In some embodiments, layers 48, 52 of container 10 comprise between 40% and 45% of the wall thickness of container 10. In some embodiments, layers 48, 52 of container 10 comprise between 45% and 50% of the wall thickness of container 10. In some embodiments, layers 48, 52 of container 10 comprise between 50% and 55% of the wall thickness of container 10.

In some embodiments, the single layer of top portion 25 has the same thickness as the combined thickness of layers 46, 48, 50, 52, 54. In some embodiments, layers 46, 48, 50, 52, 54 each have the same thickness. In some embodiments, at least one of layers 46, 48, 50, 52, 54 has a thickness that is greater than a thickness of another one of layers 46, 48, 50, 52, 54. In some embodiments, at least one of layers 46, 48, 50, 52, 54 has a thickness that is less than a thickness of another one of layers 46, 48, 50, 52, 54. In some embodiments, layers 46, 50, 54 each have the same thickness and layers 48, 52 each have a thickness that is different than the thicknesses of layers 46, 50, 54. In some embodiments, layers 46, 50, 52 each have the same thickness and at least one of layers 48, 52 has a thickness that is greater than the thicknesses of layers 40, 44. In some embodiments, layers 46, 50, 52 each have the same thickness and at least one of layers 48, 52 has a thickness that is less than the thicknesses of layers 40, 44. In some embodiments, layers 48, 52 each have the same thickness. In some embodiments, layers 48, 52 have different thicknesses.

In some embodiments, at least one of layers 46, 48, 50, 52, 54 in container 10 comprises strength hardened PET. In some embodiments, each of layers 46, 48, 50, 52, 54 in container 10 comprises strength hardened PET. In some embodiments, at least one of layers 40, 44 comprises strength hardened PET in container 10 and layers 46, 50, 54 do not. In some embodiments, at least one of layers 46, 50, 54 comprise strength hardened PET in container 10 and layers 40, 44 do not.

In some embodiments, the two-stage method includes one or more steps in a second stage of the manufacturing operation. For example, in a step S3 of the second stage, preform 18 is provided having a dome forming surface 30, thread forming surface 24 and a body forming surface 32. In some embodiments, the second stage includes a step S4, which comprises pre-heating preform 18 to a temperature in a range of about 95 degrees Celsius (C) to about 110 degrees C. In some embodiments, dome forming surface 30 is formed solely from a material, such as, for example, PET or virgin PET. In some embodiments, dome forming surface 30 is free of any additives, such as, for example, the additives discussed herein. In some embodiments, dome forming surface 30 includes a single layer is formed solely from a material, such as, for example, PET or virgin PET. That is, thread forming surface 24 is free any additives, such as, for example, the additives discussed herein. In some embodiments, thread forming surface 24 includes layers, such as, for example, layers 40, 42, 44 or layers 46, 48, 50, 52, 54 and is formed from a material, such as, for example, PET or virgin PET, and one or more additive, such as, for example, one or more of the additives discussed herein. In some embodiments, body forming surface 32 includes layers, such as, for example, layers 40, 42, 44 or layers 46, 48, 50, 52, 54 and is formed from a material, such as, for example, PET or virgin PET, and one or more additive, such as, for example, one or more of the additives discussed herein. In some embodiments, the multi-layered portion of preform 18 that includes the additives (the portion that includes layers 40, 42, 44 or layers 46, 48, 50, 52, 54) terminates below the trim point, as discussed herein, and that the portion of above the trim point includes a single layer that is free of any additives, such as, for example, the additives discussed herein.

In some embodiments, the second stage includes a step S5, which comprises mounting pre-heated preform 18 in place within cavity 20 of mold assembly 22. Mold assembly 22 has an interior mold surface shaped to correspond to the selected configuration of container 10. As discussed above, the interior mold surface can be shaped such that container 10 has any size and/or shape, depending upon the application. In some embodiments, the temperature of mold assembly 22 is in a range of about 40 degrees Fahrenheit (F) to about 110 degrees F. Preform 18 has a flange 34, which mounts on mold assembly 22 adjacent opening 28. Preform 18 has surface 30 that forms dome 36 of intermediate article 16, surface 24 that forms neck 12 of intermediate article 16 and surface 32, which forms body 38 of intermediate article 16. In some embodiments, surface 30 has a wall thickness in a range of about 0.100 inches (in) to about 0.200 in. In some embodiments, surface 24 has a wall thickness in a range of about 0.100 in to about 0.200 in. In some embodiments, surface 32 has a wall thickness in a range of about 0.100 in to about 0.200 in.

A step S6 includes blowing air into preform 18 to mold intermediate article 16, as shown in FIG. 4. In some embodiments, air is blown from a dryer and at a pressure in a range of about 35 to about 40 bar blown into an open end 40 of preform 18 to stretch or extend surfaces 30, 24, 32 and a bottom surface 42 of preform 18 radially outwardly and axially downwardly against the interior molding surface of mold assembly 22, as shown in FIG. 3. A step S7 includes removing intermediate article 16 from mold assembly 22.

In some embodiments, preform 18 has a diameter of about 3.3 inches adjacent surface 24 and a length of about 6.2 inches; and intermediate article 16 has a diameter of about 6 inches and a length of about 10.3 inches. In some embodiments, finished container 10, after trimming of intermediate article 16 as described herein, has a maximum diameter of about 7.25 inches.

In some embodiments, dome 36 is attached to an upper edge of neck 12 along an annular recess 44. In some embodiments, the second stage includes a step S8, which comprises removing and/or trimming off dome 36 from intermediate article 16 adjacent neck 12 with a trimming machine TM. Dome 36 is severed from intermediate article 16 to produce finished container 10, as shown in FIG. 3. As such, the second stage includes a step S9 of providing finished container 10.

As discussed above, the multi-layered portion of preform 18 that includes the additives (the portion that includes layers 40, 42, 44 or layers 46, 48, 50, 52, 54) terminates below the trim point and that the portion of above the trim point includes a single layer that is free of any additives, such as, for example, the additives discussed herein. In that dome 36 is formed from the single layer of top portion 25 of preform that does not include any additives, dome 36 is free of any of the additives discussed above. In some embodiments, dome 36 is scrap material that may be reused in another manufacturing process, such as, for example, the manufacturing of another container, such as, for example, another container that is the same or similar to container 10.

Dome 36 may be ground, blended, dried and added to a melt stream to produce a second preform. In some embodiments the melt stream includes virgin PET without any other additives. In some embodiments the melt stream includes PET in addition to one or more of the additives discussed above. In some embodiments the melt stream includes virgin PET without any other additives and one or more of the additives discussed above is added to the melt stream after ground, blended and dried dome 36 is added to the melt stream. The second preform is disposed in a mold, similar to step S3 discussed above. The second preform may then be pre-heated, similar to step S4 discussed above. In some embodiments, the preheated second preform is mounted in place within a cavity of a mold, such as, for example, cavity 20 of mold assembly 22, similar to step S5 discussed above. In some embodiments, the second preform is air blown to mold a second intermediate article similar to intermediate article 16, similar to step S6 discussed above. The second intermediate article is removed from the mold assembly, similar to step S7 discussed above. In some embodiments, a dome of the second intermediate article, similar to dome 36, is removed and/or trimmed off from the second intermediate article adjacent a neck of the second intermediate article that is similar to neck 12 with a trimming machine, such as, for example trimming machine TM. The dome of the second intermediate article is severed from the second intermediate article to produce a second finished container that is similar to finished container 10.

In some embodiments, the first container 10 and/or the second finished container, as described herein, can be fabricated from materials suitable for food packaging products. In some embodiments, such materials include synthetic polymers such as thermoplastics, semi-rigid and rigid materials, elastomers, fabric and/or their composites.

In some embodiments, container 10 comprises PET and the method of making container 10 discussed above may be modified to, for example, vary the crystallinity of PET. In some embodiments, the method is configured to prevent crystallization such that the PET is amorphous. Such embodiments may be used in applications where it is desired that container 10 be clear and/or container 10 is not expected to encounter elevated temperatures or aggressive chemical environments. In some embodiments, the temperature that preform 18 is exposed to during the molding process may be limited such that the temperature does not exceed a selected threshold temperature to produce container 10 wherein the PET is amorphous. In some embodiments, the selected threshold temperature is above the glass-transition temperature of PET, but below the crystallization temperature of PET.

In some embodiments, it may be desired that the PET be semi-crystalline or crystalline. Such embodiments may be used in applications where it acceptable that container 10 has at least some degree of cloudiness and/or applications where it is desired that the PET be reinforced to provide added strength. It is envisioned that having container 10 include semi-crystalline or crystalline PET may be useful for applications wherein container 10 may encounter elevated temperatures or aggressive chemical environments. In some embodiments, glass fibers and/or mineral fillers are added to provide make the PET semi-crystalline or crystalline. In some embodiments, the temperature that preform 18 is exposed to during the molding process may be required to exceed a selected threshold temperature wherein the PET is not quenched rapidly to produce container 10 wherein the PET is semi-crystalline or crystalline. In some embodiments, the selected threshold temperature is above the crystallization temperature of PET. In some embodiments, the selected threshold temperature is below the melting temperature of PET. In some embodiments, the amount of time preform 18 is exposed to the selected temperature may be varied to achieve the desired amount of crystallinity. In some embodiments, preform 18 is stretched in place of or in addition to heating preform 18 during the molding process to exceed the selected temperature. In some embodiments, the PET used has a narrow molecular weight, linear polymer chain structure, and high molecular weight to make the PET semi-crystalline or crystalline. In some embodiments, nucleating agents are added to produce container 10 wherein the PET is semi-crystalline or crystalline. In some embodiments, the nucleating agents include, for example, talc, sodium benzoate and an ionomer. In some embodiments, pressure may be applied during the molding process to produce container 10 wherein the PET is semi-crystalline or crystalline. In some embodiments, moisture may be added to preform 18 during the molding process to produce container 10 wherein the PET is semi-crystalline or crystalline.

In some embodiments, the method is adapted in one or more of the ways discussed above to produce a container that has a crystallinity between about 5% and about 40%. In some embodiments, the method is adapted in one or more of the ways discussed above to produce a container that has a crystallinity of about 10%. In some embodiments, the method is adapted in one or more of the ways discussed above to produce a container that has a crystallinity between about 15% and about 20%. In some embodiments, the method is adapted in one or more of the ways discussed above to produce a container that has a crystallinity between about 20% and about 25%. In some embodiments, the method is adapted in one or more of the ways discussed above to produce a container that has a crystallinity between about 18% and about 30%. In some embodiments, the method is adapted in one or more of the ways discussed above to produce a container that has a crystallinity between about 20% and about 40%. In some embodiments, the crystallinity of container 10 may be modified such that container 10 comprises layers that contain strength hardened PET with the characteristics discussed above.

Figure 6:
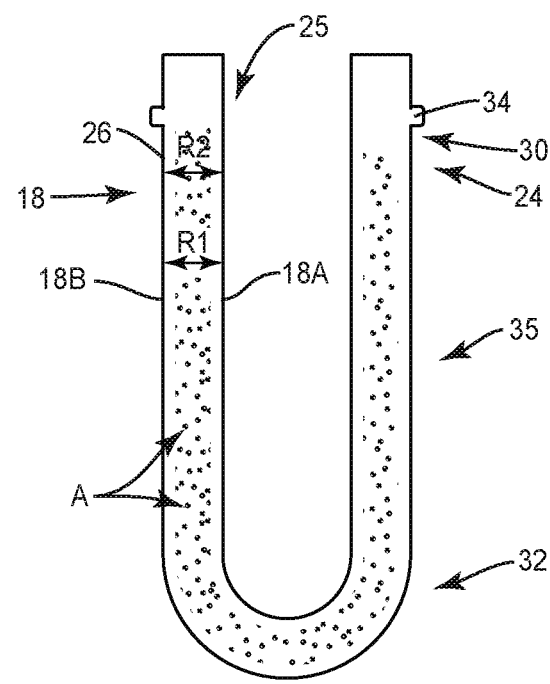
FIG. 6 is a side, cross section view of a component of one embodiment of a container system in accordance with the principles of the present disclosure.
Figure 7:
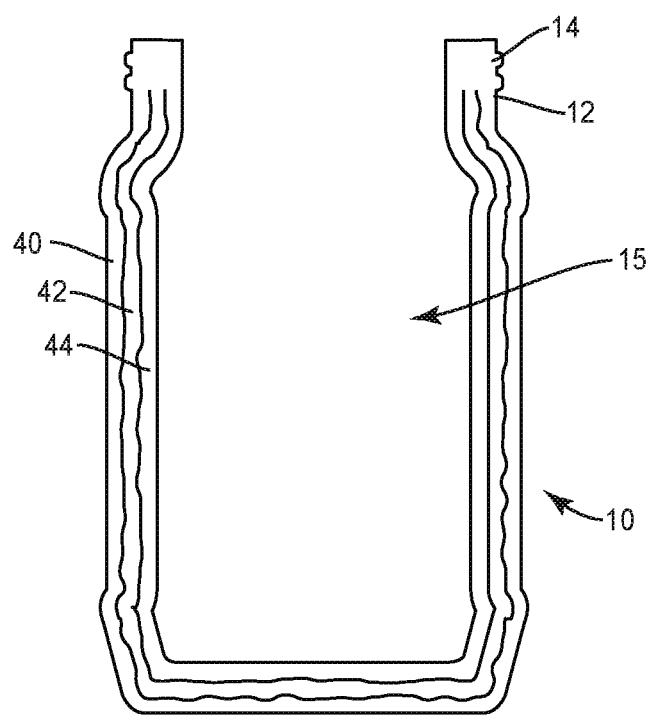
FIG. 7 is a side, cross section view of one embodiment of a component shown in FIG. 3 in accordance with the principles of the present disclosure.

In one embodiment, shown in FIG. 6, preform 18 does not include discrete layers. Rather, top portion 25 consists of one material, such as, for example, PET or virgin PET and bottom portion 35 comprises a material with at least one additive A, such as, for example, a passive scavenger and/or an active scavenger dispersed heterogeneously throughout the material in non-layered form. In other words, additive A is not in any one defined region so that layers are not detectable. In some embodiments, additive A is one or more of the additives discussed herein. In some embodiments, additive A is dispersed erratically in the material. In some embodiments, the heterogeneous distribution of additive A provides different areas or regions R of preform 18. That is, preform 18 includes some regions R, such as, for example, region R1 that do not include additive A and other regions R, such as, for example, region R2 that include additive A. In some embodiments, regions R are defined by a thickness of preform 18 that extends from an inner surface 18A of preform to an outer surface 18B of preform 18.

Figure 8:
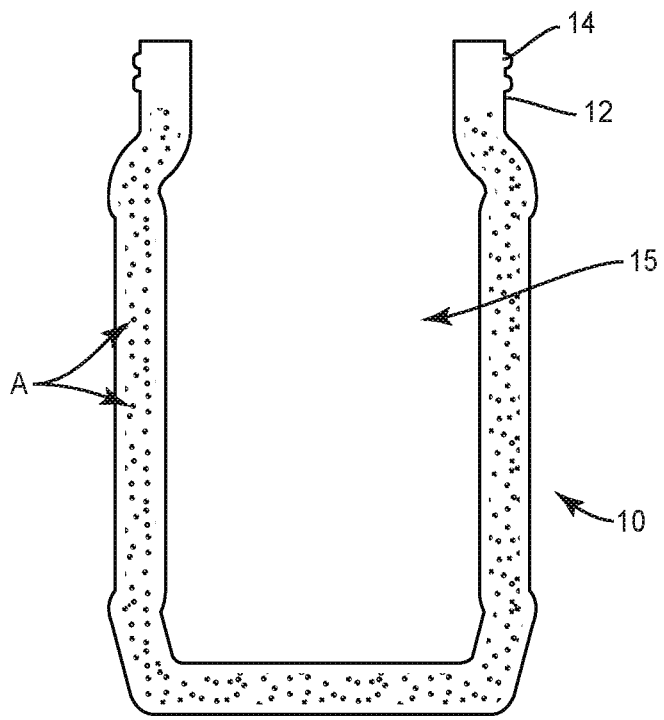
FIG. 8 is a side, cross section view of one embodiment of a component shown in FIG. 3 in accordance with the principles of the present disclosure.

During the molding process, the heterogeneous dispersion of additive A in bottom portion 35 is also present in finished container 10, as shown in FIG. 8. In some embodiments, the additive A includes an oxygen scavenger, such as, for example, one or more of the oxygen scavengers discussed herein, wherein the oxygen scavenger is configured to decrease the level of oxygen in container 10. That is, the oxygen scavenger will prevent or reduce the amount of oxygen that will be able to enter the inside 15 of container 10, hence extending the shelf life of any food and/or beverage product within container 10. Indeed, the heterogeneous dispersion of additive A can form an undefinable barrier that prevents or reduces the ability of oxygen to move from the environment surrounding container 10 to the inside 15 of container 10. In the embodiments shown in FIGS. 6 and 10, steps S3-S9 are the same as discussed above with the other embodiments.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for manufacturing a container, the method comprising the steps of:
    injection molding a preform using a two phase injection system, wherein a first phase of the two phase injection system comprises injecting a material into the preform to form a bonded single layer preform and a second phase of the two phase injection system comprises injecting the material into the bonded single layer preform to form a multi-layer preform;
    disposing the multi-layer preform in a mold;
    blow molding the multi-layer preform into an intermediate article; and
    trimming the intermediate article to form a finished container,
    wherein the multi-layer preform has inner and outer layers comprising the material and an intermediate layer comprising an additive, a top portion of the multi-layer preform being formed only from only one layer, a bottom portion section of the multi-layer preform being formed of multiple layers comprising the inner, outer and intermediate layers, the inner, outer and intermediate layers each having a non-uniform thickness.

2. A method as recited in claim 1, wherein the inner, outer and intermediate layers each have an irregular thickness.

3. A method as recited in claim 1, wherein the intermediate layer has an undulating thickness.

4. A method as recited in claim 1, wherein the intermediate layer comprises greater than 25% of a wall thickness of the finished container.

5. A method as recited in claim 1, wherein the additive is present in an amount between about 0.5 wt. % and about 5.0 wt. % of the finished container.

6. A method as recited in claim 1, wherein trimming the intermediate article comprises separating a portion of the top portion from another portion of the top portion.

7. A method as recited in claim 1, wherein the additive comprises an active oxygen scavenger.

8. A method as recited in claim 1, wherein the additive comprises a passive oxygen scavenger.

9. A method as recited in claim 1, wherein the additive comprises at least one of a group consisting of colorants, calcium carbonate fillers and foaming agents.

10. A method as recited in claim 1, wherein the additive comprises at least one of a group consisting of polymers, metals, compatibilizers, catalysts, and fatty acid salts.

11. A method for manufacturing a container, the method comprising the steps of:
    injection molding a preform using a two phase injection system having a first phase of the two phase injection system comprises injecting a material into the preform to form a bonded single layer preform and a second phase of the two phase injection system comprises injecting the material into the bonded single layer preform to form a multi-layer preform;
    disposing the multi-layer preform in a mold;
    blow molding the multi-layer preform into an intermediate article; and
    trimming the intermediate article to form a finished container,
    wherein the multi-layer preform has inner and outer layers comprising the material and an intermediate layer comprising an additive, a top portion of the multi-layer preform being formed only from only one layer, a bottom portion section of the multi-layer preform being formed of multiple layers comprising the inner, outer and intermediate layers, the intermediate layer comprising greater than 25% of a wall thickness of the finished container.

12. A method as recited in claim 11, wherein the additive is present in an amount between about 0.5 wt. % and about 5.0 wt. % of the finished container.

13. A method as recited in claim 11, wherein the layer that forms the top portion and the inner and outer layers each consist of polyethylene terephythalate.

14. A method as recited in claim 11, wherein the additive comprises at least one of a group consisting of active oxygen scavengers, passive oxygen scavengers, colorants, calcium carbonate fillers and foaming agents.

15. A method for manufacturing a container, the method comprising the steps of:
    injection molding a preform using a two phase injection system, wherein a first phase of the two phase injection system comprises injecting a material into the preform to form a bonded single layer preform and a second phase of the two phase injection system comprises injecting the material into the bonded single layer preform to form a multi-layer preform;
    disposing the multi-layer preform in a mold;
    blow molding the multi-layer preform into an intermediate article; and
    trimming the intermediate article to form a finished container,
    wherein the multi-layer preform has inner and outer layers comprising the material and an intermediate layer comprising the additive, a top section of the multi-layer preform including a flange, the top portion being formed from only one layer, a bottom portion section of the multi-layer preform being formed from multiple layers including the inner, outer and intermediate layers, the additive being unevenly dispersed throughout the inner and outer layers in a non-layered form.

16. A method as recited in claim 1, wherein a portion of the top portion comprises a flange.

17. A method as recited in claim 1, wherein the mold has a temperature in a range of about 40 degrees Fahrenheit to about 110 degrees Fahrenheit when the multi-layer preform is disposed in the mold.

18. A method as recited in claim 1, wherein the preform is injection molded at a temperature that is above a glass-transition temperature of polyethylene terephythalate (PET) and below a crystallization temperature of PET.

19. A method as recited in claim 1, wherein the preform is injection molded at a temperature that is above a crystallization temperature of polyethylene terephythalate.

20. A method as recited in claim 1, further comprising pre-heating the preform to a temperature in a range of about 95 degrees Celsius to about 110 degrees Celsius.

\* \* \* \* \*